April 15, 1941.  F. E. RUNGE  2,238,291
PHOTOGRAPHIC SOUND RECORDER
Filed April 23, 1938   3 Sheets-Sheet 1
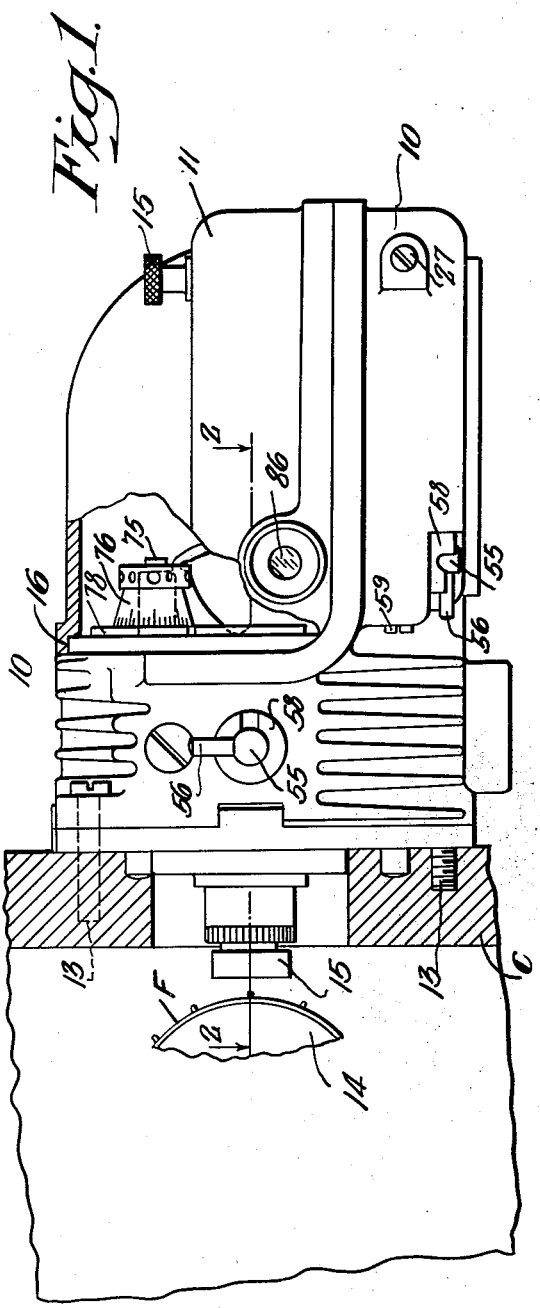
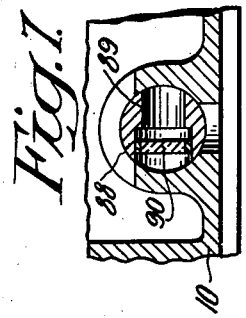
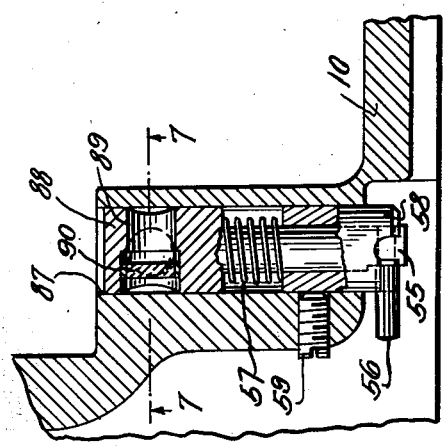
Inventor
Frank E. Runge
By J. Huff
Attorney

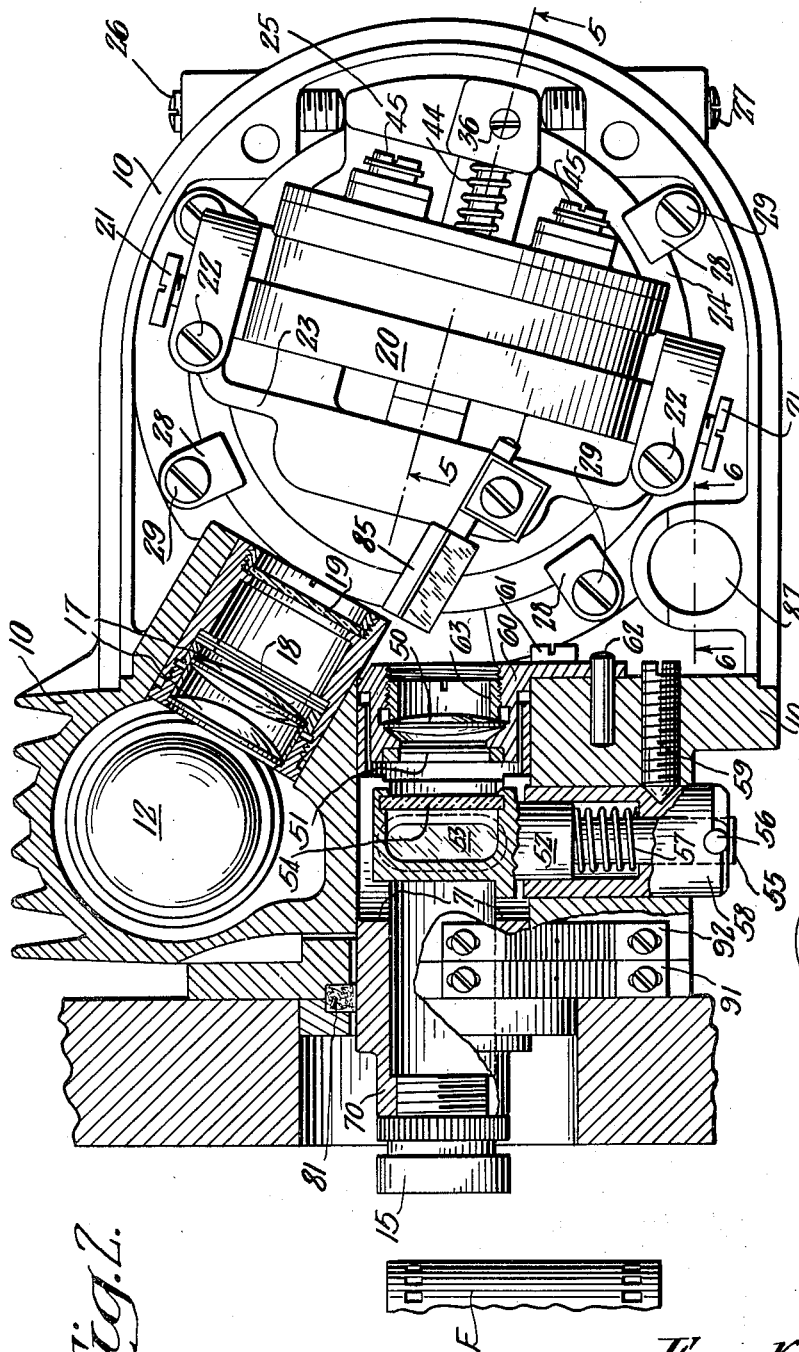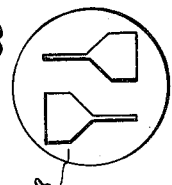

April 15, 1941.　　　　F. E. RUNGE　　　　2,238,291
PHOTOGRAPHIC SOUND RECORDER
Filed April 23, 1938　　　3 Sheets-Sheet 3
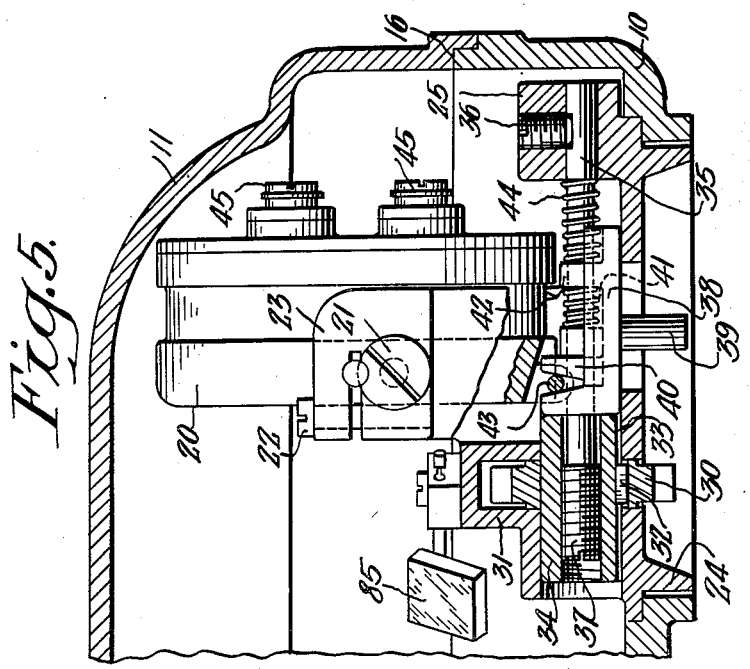
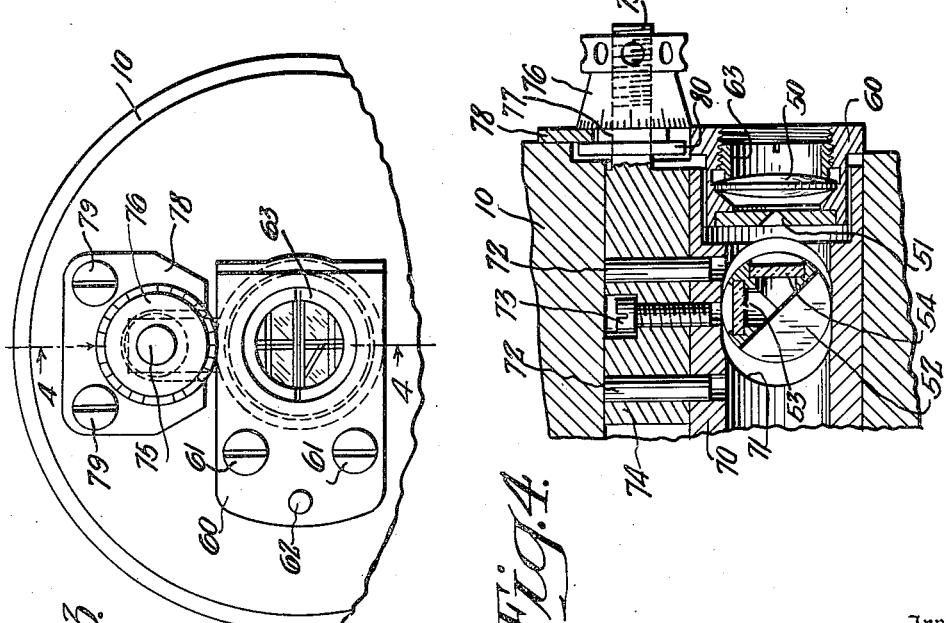
Inventor
Frank E. Runge
By
Attorney Patented Apr. 15, 1941

2,238,291

UNITED STATES PATENT OFFICE 2,238,291

PHOTOGRAPHIC SOUND RECORDER

Frank E. Runge, Oaklyn, N. J., assignor to Radio Corporation of America, a corporation of Delaware Application April 23, 1938, Serial No. 203,768

5 Claims. (Cl. 179—100.3)

This invention relates to an improved sound recording device, adapted to be attached to a motion picture camera and pertains to an extremely compact, rugged and readily adjustable device of the class described particularly adapted for use in connection with newsreel cameras.

The specific form of the invention described is one adapted to a type of motion picture camera known commercially as the "Wall" camera. The apparatus, however, can be readily modified to fit any other type of camera having a constant speed sprocket or suitable drum adjacent the housing.

The construction involves a group of inter-related parts specifically adapted to produce an extremely compact and rugged sound recording apparatus providing the portability necessary in newsreel camera work combined with the ruggedness necessary in such work.

One object of the invention is to provide a very compact sound recording device.

Another object of the invention is to provide an extremely rugged sound recording device.

Another object of the invention is to provide a sound recording device readily attachable to a motion picture camera.

Another object of the invention is to provide such a device wherein the necessary adjustments may be readily accomplished from the exterior of the apparatus.

Another object of the invention is to provide an improved sound recording device readily interchangeable from recording by white light to ultra violet recording.

Another object of the invention is to provide an improved means for viewing the recording apparatus without admitting extraneous light.

Another object of the invention is to provide an improved mechanism for focusing the objective on the film at the recording point in apparatus of the class described.

Another object of the invention is to provide an improved galvanometer mounting.

Another object of the invention is to provide means for readily tilting the entire galvanometer at will.

Other and incidental objects of the invention will be apparent to those skilled in the art from a reading of the following specification and an inspection of the accompanying drawings, in which Figure 1 is an elevation partly broken away from the left hand side of the sound recording unit, showing its relation to the film sprocket or drum;

Figure 2 is a horizontal section on the line 2—2 of Fig. 1;

Figure 3 is an elevation of the forward wall of the upper part of the housing taken from the right hand side of Fig. 1 with the cover and interior mechanism removed;

Figure 4 is a vertical section on the line 4—4 of Fig. 3;

Figure 5 is a vertical section on the line 5—5 of Fig. 2;

Figure 6 is a longitudinal section on the line 6—6 of Fig. 2;

Figure 7 is a horizontal section on the line 7—7 of Fig. 6; and

Figure 8 is an elevation of the recording aperture.

Referring first to Fig. 1, the housing 10 which contains and supports the entire recording mechanism is mounted on the camera casing C by means of appropriate cap screws 13. Within the camera casing there is the usual constant speed sprocket or drum 14 which supports the film F at the recording point in proper relation to the objective 15. The rear portion of the casing 10 is closed by means of the cover 11 which is held in place by means of appropriate thumb screws 15 and which is appropriately rabbeted as indicated at 16 to provide a light-tight joint.

Referring now to Fig. 2: Light from the exciter lamp 12 passes through the quartz condenser lenses 17 to the aperture 18 (shown in detail in Fig. 8) and then through the quartz cover 19 whence the light passes to the front of the galvanometer 20. This galvanometer 20 is preferably constructed in accordance with Dimmick Patent No. 1,936,833 and has at its middle a small rectangular mirror vibratible about a horizontal axis as described in the aforesaid patent. This galvanometer is mounted on appropriate trunnions 21 which may be clamped by appropriate set screws 22 carried in the yoke 23. This yoke 23 is made integral with the turntable 24, Figs. 2 and 5, on which the galvanometer is adjusted about a vertical axis. The turntable 24 is provided at the back with an extension 25 against which abut the adjusting screws 26 and 27 and the turntable is held down against the base of the casing 10 by appropriate lugs 28 which are secured in place by the screws 29. It will be apparent that on loosening either the screw 26 or the screw 27 and tightening the opposing screw, the turntable 24 will be rotated about its axis under the lugs 28 to the desired position where it may be clamped by tightening the opposing screw 26 or 27 thus fixing the galvanometer in its rotating position.

The turntable 24 is provided with a slot in the bottom through which projects the adjusting nut 30 provided with slots or other roughening on its outer edge. This nut 30 fits snugly in an appropriately machined space in the housing 31 which prevents longitudinal movement thereof and is provided with a key 32 engaging a key-way 33 in the sleeve 34. A rod 35 is fixed into the turntable 24 by the set screw 36 in a predetermined position and the other end of this rod 35 is threaded as indicated at 37 to engage the internally threaded sleeve 34. Rotation of the nut 30 therefore causes both rotation and longitudinal movement of the sleeve 34.

A member 38 is provided with apertures to slide on the rod 35 and is maintained against rotation thereon by engagement with the surface of the turntable 24 and also by the handle 39 which is integral with the member 38 and which extends through an appropriate slot in the turntable 24. This member 38 carries in a groove a second member 40 which is similarly bored to slide on the rod 35. A spring 41 which engages the shoulder 42 on the member 38 pushes the member 40 toward the left hand end of the member 38 thereby firmly engaging the horizontal pin 43 which is integral with the galvanometer 20. A second spring 44 engages the extension 25 on the turntable 24 and urges the member 38 toward the left in Figs. 2 and 5 thereby maintaining it firmly against the sleeve 34.

By means of the foregoing arrangement, rotation of the nut 30 moves the sleeve 34 endways either moving the members 38 and 40 against the opposition of or permitting them to move under the pressure of the spring 44 and correspondingly tilting the galvanometer up or down, this adjustment being fixed. When desired, however, the handle 39 may be moved to the right in Fig. 5 independent of any movement of the sleeve 34 thereby tilting the galvanometer 20 down and making a corresponding indication upon the film F. When the handle is released the galvanometer is again brought to its previously adjusted position under the control of spring 44.

The galvanometer is provided with terminals 45 for connection of a source of audio frequency current.

Light from the galvanometer is reflected to the lens 50 which directs it upon the recording slit 51 (Fig. 4) both shown in elevation in Fig. 3. The recording slit as shown in Fig. 3 is provided with appropriate engraved indicia on its surface to assist in the proper setting of the galvanometer, etc. After passing through the slit 51 the light passes through the cylindrical member 52 to the objective 15. This cylindrical member 52 is provided with two glass filters 53 and 54, one of which, 54, is a material, such as a Corning red purple ultra filter glass No. 597, adapted to transmit practically entirely ultra violet light. The other piece of glass 53 is optical glass of appropriate thickness to compensate for the change in optical path which would otherwise occur if the glass 54 were removed.

As will be apparent from Figs. 2 and 4 the member 52 is provided with an extension 55 and an operating handle 56. When this operating handle is in the upper position shown in Fig. 1 the ultra violet filter 54 is in place. In order to remove this filter and place the clear piece of glass or quartz 53 in the proper position, the handle 56 is moved outward against the pressure of the spring 57 which removes it from its notch in the sleeve 58 and the handle 56 is then turned clockwise 90° when it falls into a second notch in this sleeve 58 maintaining the optical member 53 in the correct position. The sleeve 58 which may be of steel is held in the casing 10 which is preferably of aluminum or other appropriate light alloy by the set screw 59.

The slit member 51 is appropriately secured into the slit bracket 60 which is fastened to the member 10 by appropriate screws 61 and a dowel pin 62, Figs. 2 and 3, and the lens 50 is secured into this same bracket member by means of an appropriate threaded sleeve 63. The slit is thereby maintained in fixed relation to the aperture 18 and the galvanometer 20 at all times irrespective of the adjustment of the objective lens 15, which is next described.

The objective lens 15 is mounted in a slidable tube 70 provided with elliptical slits as indicated at 71 so that it can move in relation to the rotatable member 52 without interference therewith. As shown in detail in Fig. 4, this tube 70 is secured by means of dowels 72 and a screw 73 to a key 74 slidable in an appropriate key-way in the housing 10. This key 74 is provided with a threaded extension 75 which is engaged by the graduated capstan head nut 76. This nut is provided with an appropriate annular groove 77 of such width as to snugly engage the fixed plate 78 which is secured to the casing 10 by the screws 79. The annular groove 77 provides, of course, a corresponding flange 80 and on rotation of the capstan head nut 76 either the nut 76 or the flange 80 engages the side of the plate 78 to move the key 74 and with it the objective tube 70 along the optical axis in order to properly focus the image of the slit 50 upon the film F. This plate 78 is provided with appropriate indicia either a single index mark or a vernier adapted to register with the graduations on the capstan head nut 76 in order to indicate the position of the objective 15. A packing means 81, such, for example, as a felt ring, is provided around the objective lens panel 70 in order to prevent any dirt or stray light from entering the interior of the camera.

Appropriate vernier scales 90 and 91 may be provided to indicate the lateral position of the optical system in relation to the sound track.

A mirror 85 is mounted in appropriate relation to the slit 50, Fig. 2, and the viewing aperture 86, Fig. 1, so that if the operator looks into the aperture 86 when it is opened he will be enabled to see the reflected image of the slit plate 63 (Fig. 3) in the mirror 85 and to see the relation of the aperture image to the index lines thereon. It will be apparent that if the aperture 86 were left open at all times stray light would interfere with the proper operation of the apparatus. In order to prevent the entry of such stray light, I provide in the vertical cylindrical recess 87 which lies just inside of the viewing aperture 86 an appropriate cylindrical plug 88 provided with a diametral aperture 89 in which a small lens 90 is fixed which serves to magnify the image of the slit and also to exclude dust or moisture from the interior of the apparatus. This cylindrical member 88 is provided with the same kind of extension and actuating member 55, 56, spring 57, guiding sleeve 58 and retaining screw 59, as described above in connection with the ultra violet filters 53 and 54. It will be apparent that in one position of the diametral aperture 89 no light can enter the casing of the device, while in the other position excess light is precluded from entering from the aperture 86 by the eye of the operator.

The aperture 18 shown in more detail in Fig. 8 is of the push-pull type described in detail and claimed in Dimmick Patent No. 2,097,657.

I claim as my invention:

1. In a sound recording unit, a galvanometer mounting comprising a turntable, means for rotationally adjusting said turntable, a yoke mounted on said turntable, trunnions mounted in said yoke for supporting the galvanometer, and a longitudinally slidable member mounted in said turntable for adjusting said galvanometer on said trunnions.

2. In a sound recording unit, a galvanometer mounting comprising a turntable, means for rotationally adjusting said turntable, a yoke mounted on said turntable, trunnions mounted in said yoke for supporting the galvanometer, a longitudinally slidable member mounted in said turntable for adjusting said galvanometer on said trunnions, and means for tilting said galvanometer in said trunnions independently of said adjusting means.

3. In apparatus of the class described, light transmitting means comprising an apertured tubular member, a diametrally apertured cylindrical member rotatable within said tubular member, said diametral aperture being so located as to coincide with said first aperture, and means for rotating the latter of said members, said diametral aperture having a lens mounted therein.

4. Galvanometer positioning means including a fixed rod, a sleeve threaded to said rod and movable in relation thereto, means for moving said sleeve, a spring pressed yoke abutting said sleeve and adapted to engage a member on the galvanometer, and spring means pressing said yoke against said sleeve.

5. In apparatus of the class described, a cylindrical member adapted to extend across a light beam, said cylindrical member having two diametral apertures substantially perpendicular to each other, a light filter in one of said apertures, a transparent compensating member in the other of said apertures, and means for rotating said cylindrical member whereby either said filter or said compensating member may be selectively placed in the light beam.

FRANK E. RUNGE.